March 6, 1934. L. A. HYLAND 1,950,246
CONSTANT TEMPERATURE CONTROL FOR MECHANICALLY VIBRATILE ELEMENTS
Filed March 9, 1929
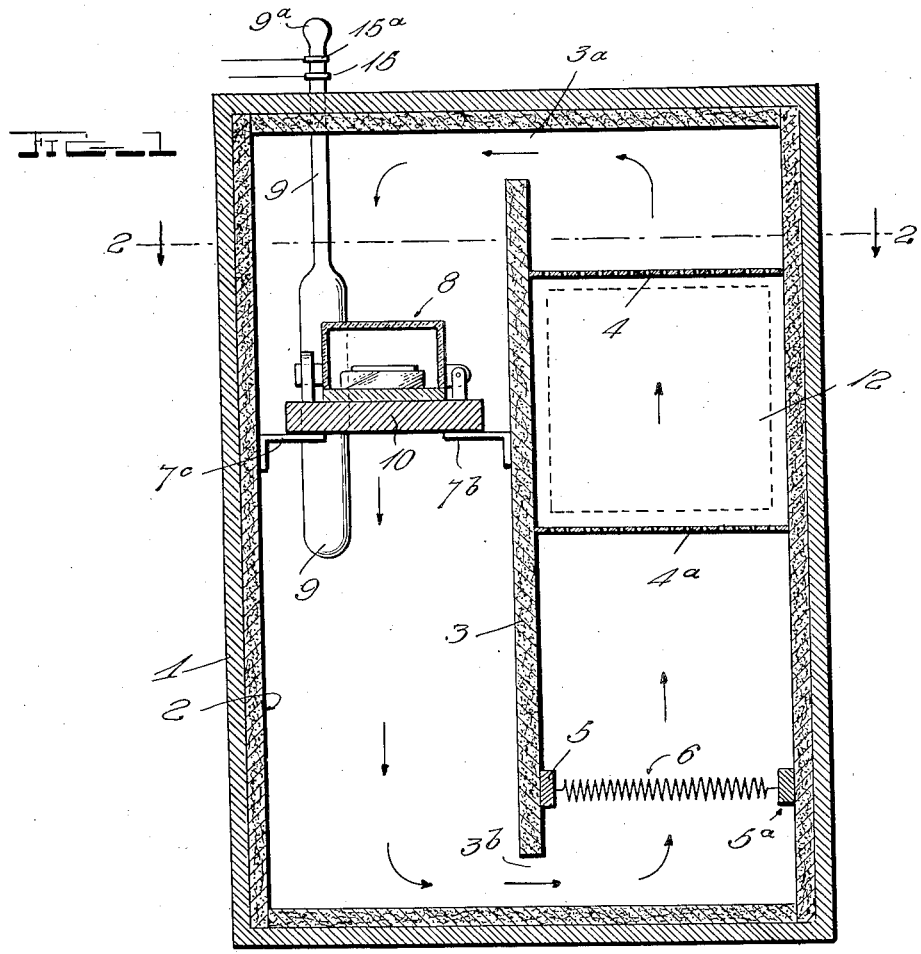
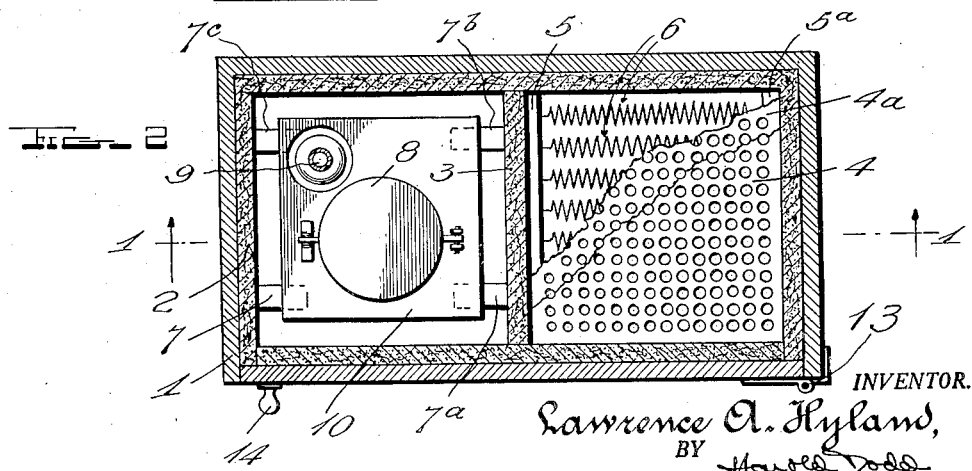
INVENTOR.
Lawrence A. Hyland,
BY
ATTORNEY.

Patented Mar. 6, 1934

1,950,246

UNITED STATES PATENT OFFICE 1,950,246

CONSTANT TEMPERATURE CONTROL FOR MECHANICALLY VIBRATILE ELEMENTS

Lawrence A. Hyland, Washington, D. C., assignor to Wired Radio, Inc., New York, N. Y., a corporation of Delaware Application March 9, 1929, Serial No. 345,867

16 Claims. (Cl. 219—19)

My invention relates broadly to the temperature control of mechanically vibratile elements employed in signaling systems.

One of the objects of my invention is to provide a temperature control for mechanically vibratile elements whereby the physical dimensions of such elements remain substantially constant.

Another object of my invention is to provide certain improvements in controlling the temperature of piezo electric elements whereby the frequency characteristics of said elements remain substantially constant.

Still another object of my invention is to provide certain improvements in the temperature control of mechanically vibratile elements generally, a better understanding of which can be had from the description following and from the accompanying drawing, wherein:

Figure 1 shows a side elevation in section of my invention and Fig. 2 shows a top plan view in part section of my invention.

In signaling systems employing high frequency energy it is necessary to maintain the generated and transmitted energy within certain narrow limits. It is well known to those skilled in the art that certain elements can be caused to respond to electrical energy subjected thereto, when the frequency of such energy is substantially the same as the fundamental frequency characteristics of the element or a multiple frequency thereof. It is also well known to those skilled in the art that the frequency characteristics of such elements are proportional to the physical dimensions of such elements. It is known that such physical dimensions of the elements employed, change with changes in the temperature of the elements. An increase of temperature causes an expansion of the element therefore increasing its physical dimensions and correspondingly decreasing the frequency characteristics. Conversely, a decrease of temperature causes a contraction of the element which in effect reduces the physical dimensions and hence increases the frequency characteristics of the element. It is therefore necessary, where accuracy of frequency characteristics is desired, to maintain the mechanically vibratile element at a substantially constant temperature.

Many methods which have been employed heretofore have provided for maintaining the frequency characteristics constant by maintaining the temperature of the mechanically vibratile element constant. Most of such methods employ a thermostat for controlling the temperature of the element by opening or closing the circuit to an electric heater. In such arrangements it is difficult to properly control the heater to a great degree of accuracy.

In the constant temperature control for mechanically vibratile elements of my invention I have succeeded in regulating the temperature of the element within .03 of a degree. This regulation was obtained with only a rough working model while it is obvious that greater precision in workmanship would permit even greater accuracy of temperature control.

Fig. 1 of the accompanying drawing shows a side elevation in part section of my invention. I provide a container 1 of pressed wood or other suitable heat insulating material which encloses the apparatus in its entirety. The inner side of container 1 comprises a layer of fireproof material 2. A partition 3 extends vertically through the container 1 dividing the container into two main compartments. Partition 3 does not extend completely the height of compartment 1 but leaves relatively short openings 3a and 3b at the top and bottom respectively. The compartment shown at the left of partition 3 contains a base member 10 supported by angle members 7 and 7a. On base 10 is mounted piezo electric crystal holder 8 containing the crystal which rests adjacent to base 10. Base 10 comprises a relatively heavy metal plate having high temperature conductivity. In the compartment to the right of partition 3, I provide an electric heater 6. Heater 6 is supported by suitable heat resisting members 5 and 5a attached to partition 3 and the inner wall of container 1. I provide baffle plates 4 and 4a spacially positioned with respect to heater 6. Baffle plates 4 and 4a are of metal and have a multiplicity of holes drilled therethrough perpendicular to the plane of the plate.

The space 12 is reserved as shown in the accompanying drawing wherein any radio apparatus may be mounted such as, for instance, the oscillatory circuit of a thermionic tube. Since the mechanically vibratile element must be employed in combination with a thermionic tube circuit, it is obvious that the anode oscillatory circuit, and if desired the thermionic tube, may be mounted in the space 12 whereby the entire source of constant frequency energy is maintained at uniform temperature. A thermostat 9 is mounted in the left side compartment immediately adjacent to plate 10. The thermostat employed may be of any suitable design, including the metastatic or "thermometers" commonly employed. Bimetallic members may be employed wherein two metals having different coefficients of expansion cause a common contact to complete or interrupt an electric circuit. The thermostat illustrated herein is mounted immediately adjacent to crystal holder 8, the body containing the thermally expansive conducting material being centrally positioned with respect to plate 10. The stem of thermostat member 9 extends vertically through the top of container 1 and is represented by the reference numeral 9a. Near the top end of stem 9a I provide contact members 15 and 15a. The extreme end of stem 9a may comprise an air chamber acting as a baffle enabling prompt return of the metallic conducting material to the reservoir immediately adjacent to plate 10. It is essential that the body of thermostat 9 comprising the reservoir for the metallic conducting material be properly positioned with respect to plate 10. This will be further discussed in the specification following.

Fig. 2 of the accompanying drawing shows a top plan view of my invention in part section. Reference characters employed in Fig. 2 correspond to those of Fig. 1. Angle supporting members 7b and 7c are shown supporting plate 10, which members were not shown in Fig. 1. Metal plate 10 may be of any suitable metal or alloy. The holder 8, containing the piezo electric or other mechanically vibratile element, is mounted on plate 10 in immediate thermal contact therewith so as to cause the element to be of the same temperature as plate 10. Thermostat 9 is shown in section wherein the reservoir extends through a hole provided in plate 10, the reservoir proper extending equi-distant on either side of plate 10. Baffle plate 4 is shown in section. A multiplicity of holes are provided in plate 4 whereby currents of air may circulate. Heater element 6 comprises a plurality of lengths of electric heater wire, a continuous length of wire wound in cross fashion between supports 5 and 5a or any other suitable design of heater desired. Supporting members 5 and 5a are of suitable heat resisting material. One side of container 1 may be removable thereby admitting access to the apparatus or a suitable door may be provided. One side of container 1, as shown in the accompanying drawing, is hinged by member 13 and may be opened by knob 14. The detail as to the necessary heat insulating joints of the door may be readily discerned from Fig. 2 of the drawing. Holder 8 may have a removable lid by means of which access is had to the crystal element or other mechanically vibratile element employed to control the frequency of generated energy. Such elements include Rochelle salts, quartz and other crystals, mechanically vibrating elements and magnetostriction rods by nickel iron and the like. In employing any of the mechanically vibratile elements it is essential that the temperature of the elements remain constant. The accuracy within which the temperature is maintained determines the accuracy within which the frequency characteristics of the element are maintained.

The operation and advantages of the constant temperature control for mechanically vibratile elements of my invention may be learned from the accompanying drawing, referring particularly to Fig. 1. The air in the vicinity of heater 6, upon being heated, rises in the right side compartment. As the heated air rises and passes through the holes in baffle plate 4a, the air currents are caused to be more nearly uniform. The air then passes through the holes in baffle plate 4 where the temperature of the air currents are made more uniform. The heated air then passes through space 3a over the top of partition 3. The circulation continues, the air passing downward surrounding thermostat 9, metallic plate 10 and holder 8 and through space 3b below partition 3 to heater element 6. There is considerable difference between the temperature of the air when passing through space 3a and the temperature of the air passing through space 3b. The distance between plate 10 and the top of the reservoir of thermostat 9 is substantially equal to the distance between metal plate 10 and the bottom of the reservoir of thermostat 9. The reservoir may contain mercury or any suitable conducting liquid. As to the difference in temperature between metal plate 10 and the top of the reservoir and between metal plate 10 and the bottom of the reservoir, plate 10 is substantially neutral.

It is obvious then, insofar as the operation of thermostat 9 is concerned, that the temperature operating thermostat 9 is substantially the same as the temperature of plate 10. Metallic plate 10 is relatively heavy and not subject to small variations of temperature.

An analogy might be employed to explain the advantages of this form of constant temperature control. The temperature difference might be likened to potential difference. As to the position of plate 10, it might be likened to the neutral point or anode. Thermostat 9 is mounted through a hole in plate 10, currents of air passing through the hole and around the reservoir of the thermostat 9. Plate 10 is therefore acted upon by variations in average temperature around the plate.

When mechanically vibratile elements are employed in power circuits for sustaining oscillations, especially of high frequency energy, the temperature of the element rises considerably in operation. This temperature must be taken into consideration and the design governed thereby. If this is not done the crystal will have a temperature and frequency at heavy loads appreciably different from its temperature and frequency at light loads. The element in holder 8, being mounted on metal plate 10, is not affected by minute changes in the temperature of the air but is acted upon only by the slower variations of temperature of the heavy metal plate. Plate 10 therefore acts as a stabilizer inasmuch as it is slow to respond to temperature changes. Because of the large radiating surface of plate 10, the heat caused by the operation of the element in itself is conducted to plate 10 where it is neutralized by the surrounding air.

Should plate 10 be mounted parallel with respect to partition 3 the temperature of the plate would not be uniform throughout the plate. The upper end of the plate would be of higher temperature than that of the lower end. Air currents of varying temperature would intermittently touch different portions of the plate. Heater element 6 is of the proper design to heat substantially all of the air and prevent the existence of cold spots along the sides. For this reason the heated area adapted to heat the surrounding air should be substantially the area of the lower right compartment of container 1.

I realize that many modifications of my invention are possible and it is to be understood that the embodiments of my invention are not to be restricted by the foregoing specification or by the accompanying drawing but only by the restrictions imposed by the appended claims.

What I claim as new and desire to secure by Letters Patent of the United States is as follows:

1. In the constant temperature control of mechanically vibratile elements the combination of a container having a partition extending vertically therein dividing the same into individual compartments and forming narrow air passages between said partition and said container, interconnecting said individual compartments adjacent opposite walls of said container, a heater element contained within one compartment, a mechanically vibratile element contained within another compartment, thermostatic control means adjacent to said mechanically vibratile element, and a relatively heavy metallic plate supported between said partition and one wall of said container and carrying said mechanically vibratile element.

2. In a temperature control of mechanically vibratile elements the combination of a container having a partition dividing the same into individual compartments, and forming narrow air passages between said partition and said container interconnecting said individual compartments adjacent opposite walls of said container, a heater element contained within one compartment, a metallic plate the plane of which is perpendicular to impinging waves of heat energy from said heater element mounted in a compartment of said container other than the compartment containing said heater, a mechanically vibratile element mounted on said metallic plate, and thermostatic control means mounted adjacent said mechanically vibratile element connected to control said heater element.

3. In the constant temperature control of mechanically vibratile elements the combination of a container having a partition extending vertically dividing the interior into individual compartments with air passages between said compartments at both the top and bottom of said partition, a metallic plate positioned in one of said compartments, a heater element in the other of said compartments, a mechanically vibratile element mounted on said metallic plate, and thermostatic control means mounted adjacent said mechanically vibratile element and connected to said heater element.

4. In the constant temperature control of mechanically vibratile elements the combination of a container having a partition extending vertically dividing the interior into individual compartments with air passages between said compartments at both the top and bottom of said partition, a metallic plate the plane of which is perpendicular to the plane of said partition mounted in one of said compartments, a heater element in the other of said compartments, a mechanically vibratile element mounted on said metallic plate, and thermostatic control means mounted adjacent said mechanically vibratile element and connected to control said heater element.

5. In the constant temperature control of mechanically vibratile elements the combination of a container having a partition extending vertically dividing the interior into individual compartments with air passages between said compartments at both the top and bottom of said partition, a metallic plate positioned in one of said compartments, a mechanically vibratile element mounted on said metallic plate, a heater element in the other of said compartments, perforated metallic plate members interposed in said compartment containing said heater element for equalizing the temperature of air currents, and thermostatic means adjacent said mechanically vibratile element for controlling said heater element.

6. In the constant temperature control of mechanically vibratile elements the combination of a container having a partition extending vertically dividing the interior into individual compartments with air passages between said compartments at both the top and bottom of said partition, a metallic plate positioned in one of said compartments, a mechanically vibratile element mounted on said metallic plate, a heater element in the other of said compartments, perforated plate members positioned perpendicular to said partition in the path of air currents from said heater element, and thermostatic means adjacent said mechanically vibratile element for controlling said heater element.

7. In the constant temperature control of mechanically vibratile elements the combination of a container having a partition extending vertically dividing the interior into individual compartments with air passages between said compartments at both the top and bottom of said partition, a metallic plate positioned in one of said compartments, a mechanically vibratile element mounted on said metallic plate, a thermostat positioned adjacent to said mechanically vibratile element, and a heater element in the other of said compartments adapted to be controlled by said thermostat.

8. In the constant temperature control of mechanically vibratile elements the combination of a container having a partition extending vertically dividing the interior into individual compartments with air passages between said compartments at both the top and bottom of said partition, a metallic plate positioned in one of said compartments, a mechanically vibratile element mounted on said metallic plate, a thermostat positioned adjacent to said mechanically vibratile element and a heater element in the other of said compartments connected for control by said thermostat.

9. In the constant temperature control of mechanically vibratile elements the combination of a container having a partition extending vertically dividing the interior into individual compartments with air passages between said compartments at both the top and bottom of said partition, a mechanically vibratile element, a metallic plate the plane of which is perpendicular to the plane of said partition positioned in one of said compartments, said vibratile element being mounted on said plate, a thermostat positioned adjacent to said mechanically vibratile element, and a heater element in the other of said compartments adapted for control by said thermostat.

10. In the constant temperature control of mechanically vibratile elements the combination of a container having a partition extending vertically dividing the interior into individual compartments with air passages between said compartments at both the top and bottom of said partition, a metallic plate mounted in one of said compartments, a mechanically vibratile element mounted on said metallic plate, a thermostat mounted adjacent to said mechanically vibratile element, a heater element in the other of said compartments, perforated metallic plate members interposed in the last said compartment for equalizing the temperature of air currents, and means whereby said thermostat controls said heater element.

11. In the constant temperature control of mechanically vibratile elements the combination of a container having a partition extending vertically dividing the interior into individual compartments with air passages between said compartments at both the top and bottom of said partition, a metallic plate mounted in one of said compartments, a mechanically vibratile element mounted on said metallic plate, a thermostat mounted adjacent to said mechanically vibratile element, a heater element in the other of said compartments, perforated plate members mounted in the compartment containing said heater element perpendicular to said partition in the path of air currents from said heater element, and means whereby said thermostat controls said heater element.

12. In a system for temperature control of mechanically vibratile elements, a container, a vertical partition in said container extending close to but not touching said container and dividing said container into individual compartments, and forming narrow air passages between said compartments at the top and bottom of said partition, a heater element contained within one of said compartments, a metallic plate member mounted in another of said compartments, a mechanically vibratile element mounted on said plate member, a thermostat mounted adjacent but not touching said plate member and in the path of air currents passing through said compartment, and means whereby said thermostat controls said heater element.

13. In a system for temperature control of mechanically vibratile elements, a container, a vertical partition in said container extending close to but not touching said container and dividing said container into individual compartments, and forming narrow air passages between said compartments at the top and bottom of said partition, a heater element contained within one of said compartments, a metallic plate member mounted in another of said compartments, a mechanically vibratile element mounted on said plate member, a thermostat adapted to control said heater element, said plate member being apertured for receiving said thermostat in adjacent but non-contiguous relation, whereby said thermostat is acted upon by radiation from said plate member and by air currents circulating through said compartment.

14. In a system for temperature control of mechanically vibratile elements, a container, a vertical partition in said container extending close to but not touching said container and dividing said container into individual compartments, and forming narrow air passages between said compartments at the top and bottom of said partition, a heater element contained within one of said compartments, a metallic plate member mounted in another of said compartments, a mechanically vibratile element mounted on said plate member, a thermostat mounted closely adjacent said mechanically vibratile element and sensitively responsive to changes in temperature of said mechanically vibratile element, and means whereby said thermostat controls said heater element.

15. In a system for temperature control of mechanically vibratile elements, a container, a vertical partition in said container extending close to but not touching said container and dividing said container into individual compartments, and forming narrow air passages between said compartments at the top and bottom of said partition, a heater element contained within one of said compartments, a metallic plate member mounted in another of said compartments substantially midway the height of said compartment, a mechanically vibratile element mounted on said plate member, a thermostat mounted adjacent but not touching said plate member and in the path of air currents passing through said compartment, and means whereby said thermostat controls said heater element.

16. In a system for temperature control of mechanically vibratile elements, a container, a vertical partition in said container extending close to but not touching said container and dividing said container into individual compartments, and forming narrow air passages between said compartments at the top and bottom of said partition, a heater element contained within one of said compartments, a metallic plate member mounted in another of said compartments, a mechanically vibratile element mounted on said plate member, a thermostat mounted adjacent but not touching said plate member and in the path of air currents passing through said compartment, means whereby said thermostat controls said heater element, and a pair of perforated plates specially disposed approximately horizontally in said heater compartment and forming an enclosure opposite said mechanically vibratile element.

LAWRENCE A. HYLAND.